(No Model.) 2 Sheets—Sheet 1.

C. F. PIKE.
Diving Bell.

No. 230,197. Patented July 20, 1880.

WITNESSES:
James Rigby
F. L. West

INVENTOR:
C. F. PIKE,
BY H. W. Beadle & Co.
ATTYS (No Model.)  2 Sheets—Sheet 2.
C. F. PIKE.
Diving Bell.
No. 230,197. Patented July 20, 1880.
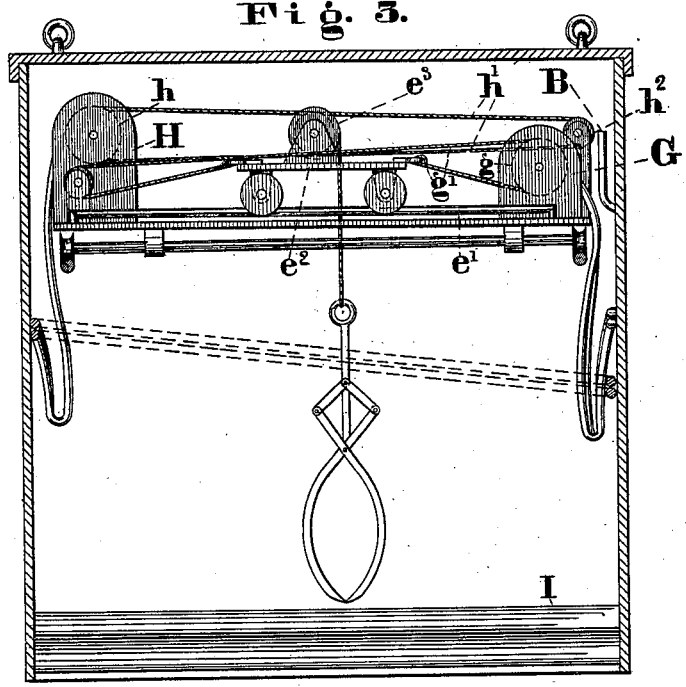
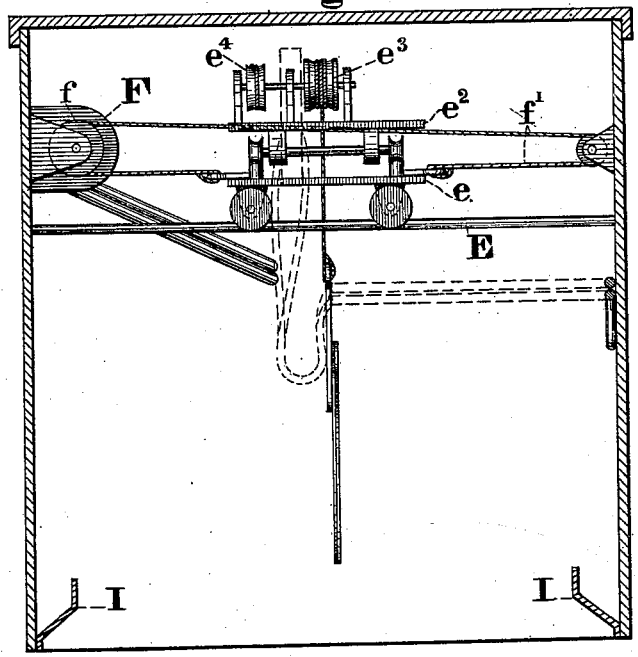
WITNESSES:
James Rigby
C. L. West
INVENTOR:
C. F. PIKE,
BY H. W. Beadle + Co.
ATTYS.

United States Patent Office.

CHARLES F. PIKE, OF PHILADELPHIA, PENNSYLVANIA, ASSIGNOR TO THE INTERNATIONAL SUBMARINE COMPANY, OF NEW HAVEN, CONN.

DIVING-BELL.

SPECIFICATION forming part of Letters Patent No. 230,197, dated July 20, 1880.

Application filed April 26, 1880. (No model.)

*To all whom it may concern:*

Be it known that I, CHARLES F. PIKE, of Philadelphia, county of Philadelphia, and State of Pennsylvania, have invented a new and Improved Diving-Bell; and I do hereby declare the following to be a full, clear, and exact description of the same, reference being had to the accompanying drawings, and to the letters of reference marked thereon.

This invention is a diving-bell of peculiar construction, the same being provided with two distinct compartments or chambers, one of which is entirely closed against the entrance of water, and the other of which is open below to permit the entrance of the same, as will be fully described hereinafter.

Figure 1:
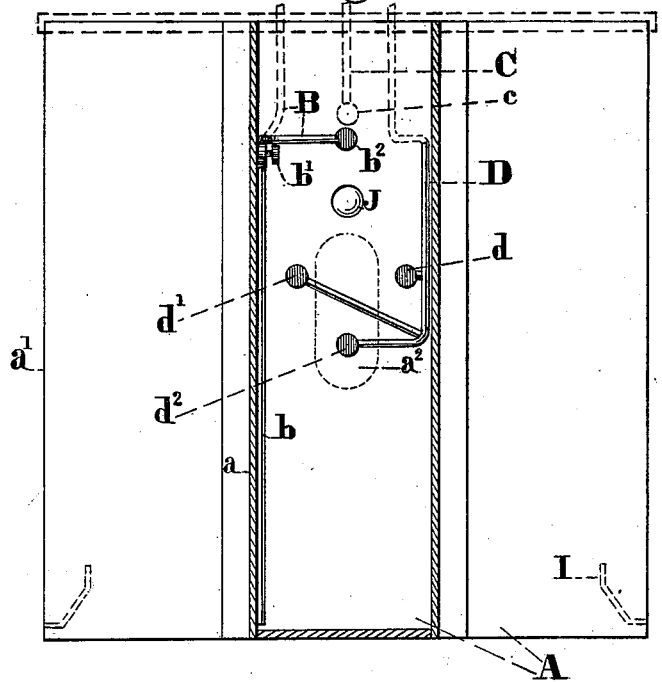
Figure 2:
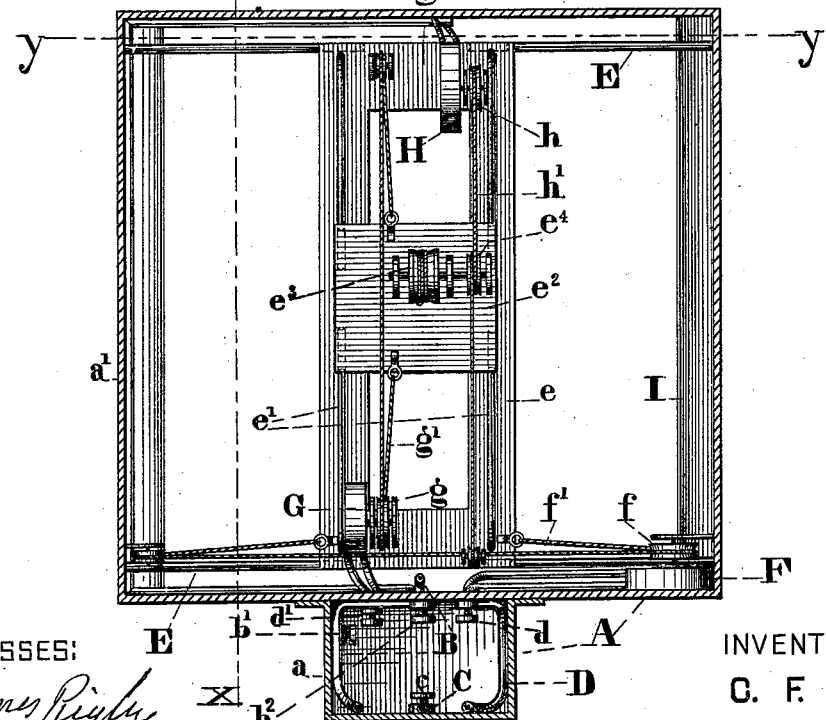

In the drawings, Figure 1 represents a side elevation of my improved diving-bell with the front wall of the smaller compartment broken away to show the interior of the same; Fig. 2, a plan view of the bell with the top removed to show the interior construction; Fig. 3, a sectional elevation on the line $x\ x$, Fig. 2, and Fig. 4 a sectional elevation on the line $y\ y$, Fig. 2.

To enable others skilled in the art to make my improved bell, I will proceed to describe fully the construction of the same and the manner in which it is employed.

A, Figs. 1 and 2, represents the diving-bell, having the compartment $a$ closed upon all sides against the entrance of water, and the compartment $a'$ closed upon all sides excepting the bottom, which is open, as shown.

$a^2$, Fig. 1, represents, in dotted lines, a manhole, by means of which the diver is permitted to enter the compartment $a$.

B, Figs. 1 and 2, represents a pipe extending downward into chamber $a$ from the vessel or wharf above, through which compressed air from any proper source of supply is conveyed.

$b$, Fig. 1, represents a branch of pipe B, which opens into the chamber $a$, near the bottom of the same, as shown, through which air for breathing is delivered.

$b'$ represents a valve by means of which the supply of this air to the chamber $a'$ is controlled.

$b^2$ represents a valve in the pipe B, by means of which the supply of compressed air to the chamber $a'$ is controlled, the pipe itself being carried through the division-wall and extended upward to near the top of the chamber, as shown in Figs. 2 and 3.

C, Figs. 1 and 2, represents the exhaust-pipe, opening below into chamber $a$, and discharging above into the atmosphere, which is provided with a cock, $c$, by means of which communication through the same may be shut off in case of accident.

D, Figs. 1 and 2, represents a pipe extending downward into the chamber $a$ from the vessel or wharf above, through which water from any proper source of supply is conveyed.

$d\ d'\ d^2$, Fig. 1, represent branches of this pipe, each of which is provided with a two-way cock or water-valve for purposes hereinafter explained.

E E, Figs. 2 and 4, represent ways or guide-bars extending across the chamber $a'$, near the top of the same, upon which are supported the ends of the frame $e$, the latter being free to move thereon in either direction.

$e'\ e'$, Figs. 2 and 3, represent ways or guide-bars extending across the frame $e$, upon which is supported the plate or frame $e^2$, having the hoisting-wheel $e^3$, with pulley $e^4$, Fig. 2, as shown.

F, Figs. 2 and 3, represents a water-wheel case, of any suitable construction, supported by proper bearings upon one side of the chamber $a'$, which is provided inside with a right and left hand water-wheel, the shaft of which has a pulley, $f$, as shown.

$f'$ represents a rope wound about the pulley $f$, the ends of which are attached to the frame, one portion of the rope being carried about an opposite guide-pulley, as shown. This water-wheel, by means of suitable pipes, is connected to the two-way cock $d$ in chamber $a$.

G, Figs. 2 and 3, also represents a water-wheel case, supported by proper bearings upon one side of the frame $e$, which is provided inside with a right and left hand water-wheel, the shaft of which has a pulley, $g$, as shown.

$g'$ represents a rope wound about the pulley, the ends of which are attached to the frame $e^2$, one portion of the rope being carried over an opposite guide-pulley, as shown. This water-wheel, by means of suitable pipes, is connected with the two-way cock $d'$ in chamber $a$.

H, Figs. 2 and 3, also represents a water-wheel case supported by proper bearings upon one side of the frame e, which is provided inside with a right and left hand water-wheel, the shaft of which has a pulley, h, as shown.

h' represents an endless rope which renders through the eye or pulley $h^2$, Fig. 3, and over pulleys h and $e^4$, Fig. 2, a turn or two of the same being taken around these latter, as shown. This water-wheel, by means of suitable pipes, is connected with the two-way cock $d^2$ in chamber a.

I I are side-plates or pockets, located at the bottom of the chamber a', for receiving any articles which may be raised by the hoisting mechanism.

J represents one or more sight-holes in the wall between the two chambers.

The operation is substantially as follows: The diver having entered the chamber a and the man-hole having been tightly closed, the bell may be lowered to the proper place. When thus lowered the chamber a, containing the diver, will be free from water, i, while the chamber a' will be full of the same. The diver now, by turning the cock $b^2$ and admitting compressed air into chamber a', can expel the water from the same. This chamber a' then being illuminated by any proper means, its entire interior becomes visible to the diver, and any article contained therein may be seized and raised by the hoisting device.

The hoisting devices, by means of the mechanism described, may be caused to travel to any part of the chamber, movement transversely in either direction being caused by the water-wheel F, Fig. 2, and longitudinally in either direction by the water-wheel G. Movement of the mechanism for hoisting either up or down is caused by the water-wheel H. The movement of the water-wheels is reversed to change the direction of the actuated parts by simply reversing the two-way cock in the chamber a in the manner well understood.

Some of the advantages of the described construction are as follows: By means of the compartment a, which is entirely closed against the entrance of water, the diver is enabled to perform the necessary operations without being exposed to more than ordinary pressure, while if the compartment a' were occupied the pressure borne would be in proportion to the depth of water.

By the employment of the compartment a' in connection with the compartment a, the diver is enabled, after the water has been expelled from the former, to see whatever may be contained therein, while if the water were retained in compartment a', and the same should be muddy or dirty, nothing could be seen at any distance.

Having thus fully described my invention, what I claim as new, and desire to secure by Letters Patent, is—

1. In a two-part diving-bell having an open apartment in which the exerting-pressure is proportioned to the depth, an independent apartment for the diver, permanently closed when in use, in which the atmospheric pressure may be maintained substantially as described.

2. In combination with a diving-bell having two independent compartments, actuating mechanism, substantially as described, in one compartment, and seizing or grappling mechanism in the other, the latter being controlled by the former.

3. In combination with the diving-bell, the water-wheels, the system of ropes and movable frames, substantially as described.

4. The described method of prosecuting submarine operations, consisting, first, in the employment of a two-part diving-bell, one apartment of which is permanently closed when in use and the other open; second, in lowering the bell to place with the operator in the closed apartment, in which is maintained a pressure equal to the atmospheric pressure; third, expelling the water from the open apartment in order that the contents of the chamber may be seen; and, fourth, controlling the actuating mechanism in the open apartment by mechanism in the closed apartment.

5. In the combination with a two-part bell, mechanism, substantially as described, for maintaining in each apartment a different pressure, substantially as described.

This specification signed and witnessed this 3d day of April, 1880.

CHAS. F. PIKE.

Witnesses:
H. G. GOODRICH,
JOS. J. HAGAN.